Aug. 4, 1959   G. A. LYON   2,898,151
WHEEL COVER
Filed June 6, 1955
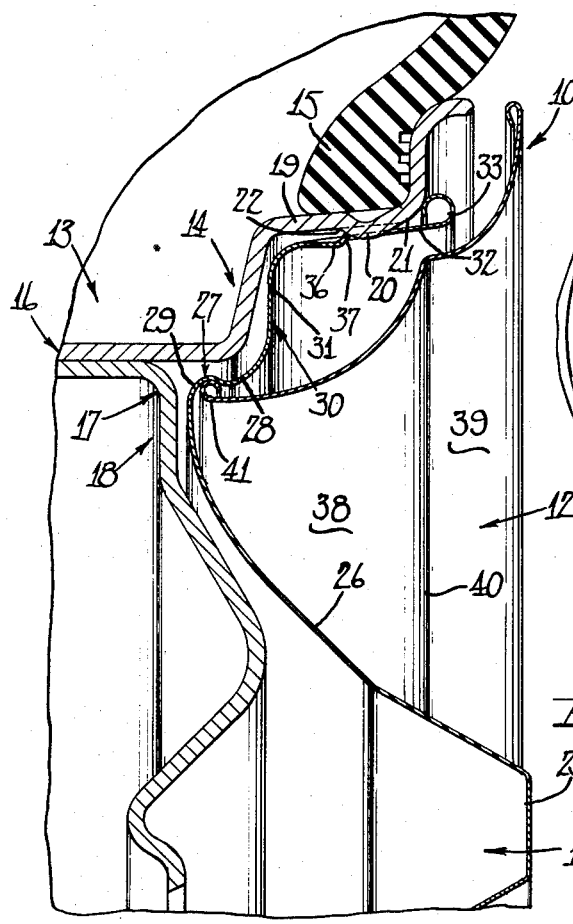
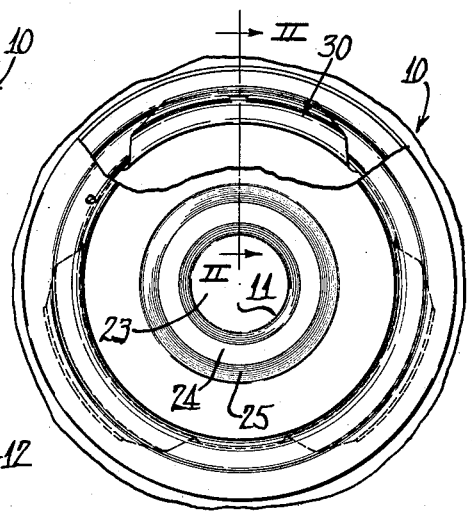
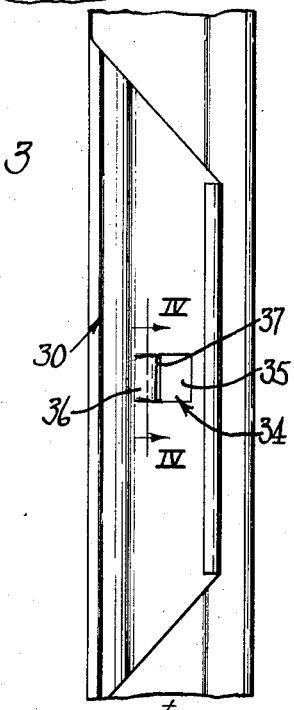
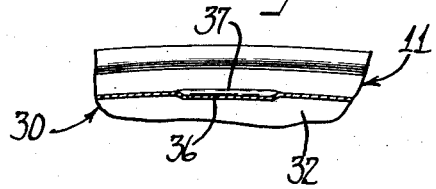
Inventor
George Albert Lyon

United States Patent Office 2,898,151
Patented Aug. 4, 1959

2,898,151

WHEEL COVER

George Albert Lyon, Detroit, Mich.

Application June 6, 1955, Serial No. 513,270

14 Claims. (Cl. 301—37)

This invention relates to improvements in wheel structures and more particularly concerns a multi-piece cover construction with improved retaining means.

In the race of automobile manufacturers to out do each other in the provision of outstanding and highly ornamental designs for the automobile, more and more emphasis is being placed on the wheel. In fact the present trend is to employ wheel covers which have exceptionally deep draws so as to give a highly ornamental and different look to the wheel.

It will be appreciated that there are limitations upon the depth to which sheet metal may be drawn without overstretching and rupturing the material. Accordingly, in view of the present demand for unusually deep draw covers the instant cover construction has been evolved to meet this demand.

It is an object of this invention to provide an improved wheel cover which lends itself to economical manufacture on large production scale and which affords an entirely different ornamental look to the wheel.

Another object of this invention is to provide novel retaining means for retaining a multi-part cover in unitary assembled relation with the wheel notwithstanding the deep axial extent of the axial draw of the component portions of the cover.

Another and further object of this invention is to provide a multi-piece cover structure wherein the outer piece conceals the wheel retaining means of the inner piece and additionally conceals the junction of the wheel parts.

Other objects and features of this invention will more fully appear from the following detailed description taken in connection with the accompanying drawings which illustrate a single embodiment thereof and in which:

Figure 1 is a fragmentary side view of a wheel structure having a multi-part cover embodying features of this invention;

Figure 2 is an enlarged fragmentary cross sectional view taken on substantially line II—II of Figure 1 looking in the direction indicated by the arrows;

Figure 3 is an enlarged fragmentary detailed view of a retaining clip and the gripping finger formed thereon; and Figure 4 is an enlarged fragmentary cross sectional view taken substantially on the line IV—IV of Figure 3 looking in the direction indicated by the arrows.

The reference numeral 10 indicates generally my novel wheel cover which includes two separate parts, an inner or center line crown cover member 11 and an outer trim cover member 12. The inner cover member 11 is adapted to be carried by the wheel 13 while the trim member 12 is carried by inner cover member 11.

The wheel 13 includes a stepped multi-flanged tire rim 14 which has suitably mounted thereon a tubeless tire assembly 15. Suitably secured at 16 to the tire rim 14 is a flanged wheel disk spider 17 which has an axially inset portion 18 of such construction as to be capable of permitting a cover having a relatively deep axial draw to be retainingly held thereon.

The tire rim 14 has an intermediate radially outwardly inclined axial flange 19 which has mounted thereon a plurality of circumferentially spaced bumps 20. The intermediate flange 19 and the bumps 20 combine together to provide a camming lead-in surface 21. In addition, on the axially inner side of the bump 20 is provided a shouldered retaining recess 22.

According to the present invention the wheel cover 10 is constructed in two separable parts with the cover member 11 engageable retainingly with the wheel in snap-on, pry-off relation with the bumps 20, while the trim member 12 is engageable in snap-on, pry-off relation with the cover member 11 and serves to conceal the cover retaining means of the cover member 11.

Now, it will be appreciated, that one of the principal objects of this invention is to provide a highly ornamental cover construction having an unusually deep axial draw which is defined by the cover members 11 and 12.

To this end, the central cover member 11 is of generally circular form and of a diameter to overlie the juncture of the spider 17 and the rim flange 14. The cover member 11 preferably employs a relatively high crown 23 which is defined on its radially outer perimeter by an axially inset channel 24. The inset channel 24 in turn merges into a second crown area 25. Projecting radially and axially inwardly from the crown 25 is a sloping annular flange portion or side wall 26 which is of such a cross section as to lie closely adjacent to the junction of the wheel parts when in assembled relation with the wheel. This deeply sloped inclined annular flange 26 is especially adapted to take advantage of the axially inset configuration of the spider 17 in achieving the desired end result of a deep axial highly ornamental draw.

The radially outer margin of the cover member 11 has provided thereon a looped terminal retaining portion 27. This looped terminal portion 27 includes a camming lead-in surface 28 and a shouldered recess 29 which comprise the retaining means for the trim member 12 as will be further discussed at a later time herein.

Secured to the outer margin of the inner cover member 11 and formed integral therewith is suitably provided my novel retaining clips or extensions 30. The resilient retaining clips 30 include a generally radially extending flange 31 which merges into a generally axially outwardly slightly radially inclined resilient flange 32 and terminates in a rim bottomed tensioning bead or extremity 33. It will be noted that the radially innermost end of the clip 30 is inclined radially and axially inwardly and participates in providing a camming lead-in surface 28.

Provided on the flange 32 is a cut out and indented portion 34 (Fig. 3). The cut out and indented portion 34 includes a notch 35 and an indented area 36 which is formed integral with the clip 30. The indented area 36 has a generally radially and axially outwardly extending relatively stiff gripping extremity or finger 37 which is adapted to engage with the bump 20 in retaining the inner cover member 11 on the wheel. It will be appreciated that by reason of indenting and forming a gripping extremity that a stiff gripping extremity may be readily obtained.

The clips 30 are of a slightly larger diameter than that defined by the inner diameter of the intermediate axial flange 19 and it is in this manner that resilient tensioned engagement may be effected. In other words, in assembly of the inner cover member on the wheel, as the inner cover member 11 including the resilient clip 30 is urged axially inwardly the stiff finger extremity 37 engages the camming lead-in surface 21 and is progressively urged over the bump as the resilient clip is flexed radially inwardly in response to the pressure and eventually engages in the shouldered recess 22. When engagement between the finger 37 and the bump 20 is effected it will be noted that the bead 33 is in bottomed cushioned engagement with the rim flange thereby affording a backing for the resilient tensioned engagement between the finger 26 and the bump 20.

The trim ring or outer member 12 is of a more or less W-construction and includes radially and axially outwardly extending arcuate annular portions 38 and 39 which are separated by an intermediate indented annular reinforcing groove 40. Provided on the radially and axially inner end of portion 38 is a gripping extremity which is preferably comprised of an annular bead. It will be appreciated that the instant trim construction is relatively severely inclined and is especially adapted to engage the inner cover member 11 in snap-on, pry-off engagement. That is, in assembly as the trim member 12 is urged axially inwardly the bead is progressively flexed over the camming surface 28 and is bottomed in the shouldered recess 29 of the loop portion 27. This is made possible by reason that the bead 41 is normally of a slightly smaller diameter than that of the radially inner diameter of the looped portion 27.

As the bead 41 is engaged with the looped terminal portion 27 a radially outward tension is exerted whereby the gripping engagement between the finger 36 and the bump 20 is strengthened.

It will now be appreciated that the outer trim member 12 is adapted to be retainingly maintained on the inner cover member 12 at the outer margin of the inner cover member. By virtue of this construction, not only is a highly ornamental deeply axially inset type cover construction attainable, but in addition, the annular ring 12 serves to hide the more or less unsightly retaining connections previously described.

Application of the cover to the wheel may be effected by bottoming the gripping fingers of the inner cover member 11 behind the retaining bumps 20. Thereafter the trim member which overlies the rim flange may be snapped over the looped terminal portion 27 into bottomed engagement with the inner cover member 11.

To remove the cover a pryoff tool may be inserted between the cover portions and more particularly the bead 33 and the pry-off rib 40 and thereafter twisted with the edge of the tool bearing against the rib 40 to release the tensioned engagement between the cover members. The instant bead 33 and rib 40 relationship is particularly advantageous in attaining proper leverage to remove the outer cover member without damage. This advantageous leverage is attained by positioning the rib generally radially slightly axially inwardly of the bead 33 although general radial alignment is also effective. A suitable tool may then be inserted under the bead 33 and upon a twist removal may be effected.

It will be understood that modifications and variations may be effected without departing from the novel concepts of the present invention.

I claim as my invention:

1. In a wheel structure including body and rim parts with the rim part having a generally axially extending intermediate flange provided with shouldered cover retaining means and connected at its axially outer side to a generally radially outwardly projecting flange, a cover for disposition at the outer side of the wheel including at least one resilient biasable spring clip provided on the cover margin on its radially outer side and with the clip extending in generally opposed relation to the intermediate flange, said clip having an outer terminal bead biasable with said clip for bottomed engagement with said radial flange and having shoulder gripping retaining means provided axially inwardly of said bead capable of cooperating with said bottoming bead in retaining the cover on the wheel.

2. In a wheel structure including body and rim parts with the rim part having a generally axially extending intermediate flange provided with shouldered cover retaining means and connected at its axially outer side to a generally radially outwardly projecting flange, a cover for disposition at the outer side of the wheel including at least one resilient biasable spring clip formed on the cover margin on its radially outer side and with the clip extending in generally opposed relation to the intermediate flange, said clip having an outer terminal bead for bottoming engagement with said radial flange and having shoulder gripping retaining means formed axially inwardly of said bead capable of cooperating with said bottoming bead in retaining the cover on the wheel, said shoulder gripping retaining means having a stiff gripping finger thereon capable of interlockingly engaging with the shouldered means as the resilient clip and stiff fingers are cammingly stressed against the intermediate flange in assembly with said bead being movable radially along said radial flange as said clip is stressed.

3. In a wheel structure including body and rim parts with the rim part having a generally axially extending intermediate flange provided with shouldered cover retaining means and connected at its axially outer side to a generally radially outwardly projecting flange, a cover for disposition at the outer side of the wheel including at least one resilient biasable spring clip formed on the cover margin at its radially outer side and with the clip extending in generally opposed relation to the intermediate flange, said clip having an outer terminal bead for bottoming engagement with said radial flange and having shoulder gripping retaining means provided axially inwardly of said bead capable of cooperating with said bottoming bead in retaining the cover on the wheel, said shoulder gripping retaining means having a stiff gripping finger thereon capable of interlockingly engaging with the shouldered means as the resilient clip and stiff fingers are cammingly stressed against the intermediate flange in assembly, said fingers being formed integral at one end with the clip and having a radially extending gripping edge at the other end.

4. In a wheel structure including body and rim parts with the rim part having an intermediate axial flange with cover retaining shoulder means thereon, a cover for disposition at the outer side of the wheel and having resilient biasable spring clips formed on the cover margin at its radially outer side, said spring clips having a stiff gripping finger thereon capable of interlockingly engaging with the shoulder means as the resilient clips and stiff fingers are cammingly stressed against the intermediate flange in assembly, said clip having a terminal portion thereof with said terminal portion deflectable with said clip as said clip is stressed, said terminal portion being in bottomed cushioned engagement with the rim part thereby affording a backing to maintain said finger in resilient tensioned engagement with said shoulder means.

5. In a wheel structure including body and rim parts with the rim part having an intermediate axial flange with cover retaining bumps thereon, a cover for disposition at the outer side of the wheel and having resilient biasable spring clips arranged in a circle and provided on and disposed generally radially outwardly of the margin of the cover, said spring clips each having a gripping finger thereon and a notch adjacent thereto, said finger being capable of becoming lodged behind the bumps as the clips and fingers are cammingly stressed against the intermediate flange in assembly with the bump lodging in the notch to insure relative co-movement of the wheel and cover.

6. A cover for disposition at the outer side of the wheel including inner and outer cover members having means for securing same together in pry-off relation, said inner cover member having an outer beaded terminal, said outer cover member overlying and extending radially outwardly of said bead and having an annular reinforcing pry-off rib overlying and spaced generally radially inwardly of said outer beaded terminal in order to facilitate in the separation of the cover members without damage when a pry-off tool is inserted and levered therebetween.

7. A cover for overlying disposition at the outer side of a vehicle wheel including inner and outer cover members having means therebetween to maintain said cover members in detachable assembly, said inner cover member having an outer terminal, said outer cover member overlying said inner cover member and having an annular reinforcing pry-off shoulder in generally radial spaced relation to said outer terminal in order to facilitate in the separation of the cover members without damage when a pry-off tool is inserted and levered therebetween.

8. In a wheel structure, a wheel including rim and body parts with one of the parts having an axial flange provided with radially facing shoulder means, an ornamental wheel cover member for protective disposition upon the wheel, said cover having circumferentially spaced resiliently biasable spring clips arranged in a common circle disposed radially outwardly of said cover margin, to maintain said cover in assembly upon the wheel, said clips including a generally axial extending clip portion provided with a turned finger for cover retaining engagement behind said shoulder means.

9. In a wheel structure, a wheel including rim and body parts with one of the parts having an axial flange provided with radially facing shoulder means, an ornamental wheel cover member for protective disposition upon the wheel, said cover having circumferentially spaced resiliently biasable spring clips arranged in a common circle disposed radially outwardly of said cover margin, to maintain said cover in assembly upon the wheel, said clips including a generally axial extending clip portion provided with a turned finger for cover retaining engagement behind said shoulder means, and an outer ring member concealing and overlying said clips in detachable assembly with said cover member.

10. In a wheel structure, a wheel including rim and body parts with one of the parts having an axial flange provided with radially facing shoulder means, an ornamental wheel cover member for protective disposition upon the wheel, said cover having circumferentially spaced resiliently biasable spring clips arranged in a common circle disposed radially outwardly of said cover margin to maintain said cover in assembly upon the wheel, said clips including a clip portion having an intermediate turned finger for cover retaining engagement behind said shoulder means and with an axially outer free end of said clip portion bottomed against the wheel to cooperate with said finger in attaining biased tensioned cover retaining engagement behind the shoulder means.

11. In a wheel structure, a wheel including rim and body parts with one of the parts having an axial flange provided with radially facing shoulder means, an ornamental wheel cover member for protective disposition upon the wheel, said cover having circumferentially spaced resiliently biasable spring clips arranged in a common circle disposed radially outwardly of said cover margin to maintain said cover in assembly upon the wheel, said shoulder means comprising circumferentially spaced bumps, and said clips including clip portions provided with generally radially extending fingers and with notched portions defining notches adjacent said fingers, said fingers engageable behind said bumps with said bumps engaged in said notches to maintain said cover on the wheel and to insure co-rotation of said cover and the wheel.

12. In a wheel structure, a wheel including rim and body parts with one of the parts having an axial flange provided with radially facing shoulder means, an ornamental wheel cover member for protective disposition upon the wheel, said cover having circumferentially spaced resiliently biasable spring clips arranged in a common circle disposed radially outwardly of said cover margin to maintain said cover in assembly upon the wheel, said shoulder means comprising circumferentially spaced bumps, said clips including clip portions having intermediate radially extending fingers, notched portions defining notches adjacent said fingers, and said axial clip portions having terminals to engage against said wheel when said fingers are engaged behind said bumps and when said bumps are engaged in said notches insuring co-rotation and to cooperate with said fingers in attaining biased tensioned cover retaining engagement behind the bumps.

13. In a wheel structure including body and rim parts with the rim part having a generally axially extending intermediate axial rim flange provided with cover retaining bumps and with the intermediate rim flange connected to a generally radially outwardly projecting rim flange, a wheel cover member for disposition at the outer side of the wheel including circumferentially spaced bump gripping elements arranged in a common circle radially outwardly of an outer margin of the cover, said elements having terminal bead-like areas for bottomed engagement with the radial rim flange, said elements also including notched areas for the receipt of the bumps with an axially inner edge area of the notched areas having its edge turned radially outwardly to be slid along the intermediate rim flange and biased in edgewise tensioned engagement behind the bumps.

14. In a wheel structure including body and rim parts, with the rim part having a generally radially inwardly facing rim surface and a generally axially outwardly facing rim surface disposed radially outwardly thereof, a wheel cover member for disposition at the outer side of the wheel including an outer cover margin and circumferentially spaced gripping elements connected to the outer cover margin and arranged in a common circle generally radially outwardly of and circumferentially about the outer cover margin, said elements including axially extending element portions confronting the radially inwardly facing rim surface and radially outwardly turned pry-off terminal element portions connected to the axially extending element portions for confronting disposition relative to the axially outwardly facing rim surface and to facilitate removal of the cover member from the wheel, said axially extending element portions having notched areas with an axially inner edge portion of the notched areas turned radially outwardly to engage with the radially inwardly facing rim surface in biased edgewise tensioned engagement therewith for sustaining the cover member on the wheel.

References Cited in the file of this patent

UNITED STATES PATENTS

| | | |
|---|---|---|
| 2,308,616 | Lyon | Jan. 19, 1943 |
| 2,329,921 | Lyon | Sept. 21, 1943 |
| 2,368,238 | Lyon | Jan. 30, 1945 |
| 2,490,822 | Lyon | Dec. 13, 1949 |
| 2,600,411 | Lyon | June 17, 1952 |
| 2,600,412 | Lyon | June 17, 1952 |
| 2,624,632 | Lyon | Jan. 6, 1953 |
| 2,669,487 | Horn | Feb. 16, 1954 |

FOREIGN PATENTS

| | | |
|---|---|---|
| 916,386 | Germany | July 8, 1949 |